(12) United States Patent
Mazzella

(10) Patent No.: US 9,097,378 B2
(45) Date of Patent: Aug. 4, 2015

(54) INSULATED PIPE JUNCTION JACKET FOR FREEZING THE CONTENTS OF A PIPE JUNCTION AND METHODS OF USING SAME

(75) Inventor: Carlo Mazzella, Point Blank, TX (US)

(73) Assignee: BTI Services, Inc., Houston, TX (US)

( * ) Notice: Subject to any disclaimer, the term of this patent is extended or adjusted under 35 U.S.C. 154(b) by 826 days.

(21) Appl. No.: 13/309,137

(22) Filed: Dec. 1, 2011

(65) Prior Publication Data

US 2013/0140008 A1   Jun. 6, 2013

(51) Int. Cl.
| | |
|---|---|
| *F25D 3/00* | (2006.01) |
| *F25D 3/12* | (2006.01) |
| *F25C 1/00* | (2006.01) |
| *F25C 1/22* | (2006.01) |
| *F16L 55/18* | (2006.01) |
| *F16L 59/16* | (2006.01) |
| *F28D 7/10* | (2006.01) |
| *F16L 59/10* | (2006.01) |

(Continued)

(52) U.S. Cl.
CPC .............. *F16L 59/163* (2013.01); *F28D 7/10* (2013.01); *F16L 59/02* (2013.01); *F16L 59/021* (2013.01); *F16L 59/10* (2013.01); *F16L 59/106* (2013.01); *F16L 59/141* (2013.01); *F16L 59/16* (2013.01); *F16L 59/168* (2013.01); *F16L 59/182* (2013.01); *F25D 19/006* (2013.01); *F28D 1/06* (2013.01); *F28F 2280/02* (2013.01)

(58) Field of Classification Search
CPC ...... F25D 19/006; F16L 59/106; F16L 59/10; F16L 59/02; F16L 59/021; F16L 59/141; F16L 59/16; F16L 59/163; F16L 59/168; F16L 59/182

USPC .............. 62/293, 66, 340, 239, 384; 165/166, 165/140, 165; 138/97, 15.08; 141/86, 88
See application file for complete search history.

(56) References Cited

U.S. PATENT DOCUMENTS

| | | | |
|---|---|---|---|
| 3,498,071 A | | 3/1970 | Tremont |
| 3,712,115 A | * | 1/1973 | Miller ............................ 73/49.1 |

(Continued)

FOREIGN PATENT DOCUMENTS

| | | |
|---|---|---|
| GB | 1209144 A | 10/1970 |
| GB | 2187815 A | 9/1987 |

(Continued)

OTHER PUBLICATIONS

PCT Application No. US2012/067184; International Search Report and Written Opinion of the International Searching Authority for Applicant Blowout Tools, Inc. dated Feb. 7, 2013.

(Continued)

*Primary Examiner* — Frantz Jules
*Assistant Examiner* — Steve Tanenbaum
(74) *Attorney, Agent, or Firm* — Jones Walker LLP

(57) ABSTRACT

There is a need for a flexible, insulated jacket that can be used to substantially enclose a pipe junction, then inject a cooling substance into the jacket, and thereby freeze or substantially freeze the contents of the junction. Industries conveying fluids, including fluids such as hydrocarbons, using pipes and valves would benefit from such a jacket. The jacket is shaped to substantially enclose a pipe junction connecting two or more pipes. The jacket includes a flexible insulated body having fasteners. The jacket has an open position and a closed position. The body substantially encloses the pipe junction in the closed position. The jacket further includes at least two fluid injection valves communicated through the jacket body.

20 Claims, 6 Drawing Sheets

(51) Int. Cl.
*F25D 19/00* (2006.01)
*F16L 59/02* (2006.01)
*F16L 59/18* (2006.01)
*F16L 59/14* (2006.01)
*F28D 1/06* (2006.01)

(56) References Cited

U.S. PATENT DOCUMENTS

| | | | | |
|---|---|---|---|---|
| 3,742,723 | A | * | 7/1973 | Grise ................ 137/315.01 |
| 3,905,424 | A | * | 9/1975 | Elwood et al. ................ 169/46 |
| 4,112,706 | A | | 9/1978 | Brister |
| 4,174,735 | A | | 11/1979 | Visbach |
| 4,433,556 | A | | 2/1984 | Brady |
| 4,441,328 | A | | 4/1984 | Brister |
| 4,556,082 | A | * | 12/1985 | Riley et al. ................ 137/375 |
| 4,807,669 | A | * | 2/1989 | Prestidge, Sr. ................ 138/178 |
| 4,944,161 | A | * | 7/1990 | Van Der Sanden ............ 62/293 |
| 5,548,965 | A | | 8/1996 | Chen et al. |
| 3,148,619 | A | | 9/1996 | Holinbeck |
| 5,571,233 | A | * | 11/1996 | Rolland et al. ................ 62/293 |
| 5,680,770 | A | * | 10/1997 | Hall et al. ................ 62/293 |
| 5,797,415 | A | * | 8/1998 | Nicholson et al. ......... 137/15.01 |
| 5,836,167 | A | | 11/1998 | Clouston et al. |
| 5,852,938 | A | | 12/1998 | Fuhr et al. |
| 5,924,291 | A | * | 7/1999 | Weiler et al. ................ 62/50.2 |
| 6,141,972 | A | | 11/2000 | Evans |
| 6,148,619 | A | | 11/2000 | Evans |
| 6,164,345 | A | * | 12/2000 | Haddox ................ 141/86 |
| 6,286,329 | B1 | | 9/2001 | Radichio |
| 6,434,952 | B2 | | 8/2002 | Wagner |
| 6,598,412 | B1 | | 7/2003 | Chen |
| 6,718,789 | B1 | | 4/2004 | Radichio |
| 8,763,411 | B2 | * | 7/2014 | Wray et al. ................ 62/67 |
| 2006/0196568 | A1 | * | 9/2006 | Leeser et al. ................ 138/149 |
| 2006/0218941 | A1 | * | 10/2006 | Drube ................ 62/50.2 |

FOREIGN PATENT DOCUMENTS

| | | |
|---|---|---|
| WO | 97/43575 A1 | 11/1997 |
| WO | 2013/082353 A1 | 6/2013 |

OTHER PUBLICATIONS

PCT Application No. US2012/067184; International Preliminary Report on Patentability for Applicant Blowout Tools, Inc. dated Jun. 3, 2014.

* cited by examiner

INSULATED PIPE JUNCTION JACKET FOR FREEZING THE CONTENTS OF A PIPE JUNCTION AND METHODS OF USING SAME

FIELD OF INVENTION

This disclosure is related to insulated jackets, which encompasses many forms of coverings, that are shaped to substantially enclose a junction permitting fluid communication between two or more pipes and thereby facilitate the freezing or substantial freezing of the contents of the junction.

SUMMARY OF SELECT EMBODIMENTS

One embodiment of the invention relates to a method of freezing or substantially freezing a pipe junction. An insulated jacket is used to substantially enclose the pipe junction, and then a cooling substance, e.g., liquefied carbon dioxide, is injected into the jacket through injection valves. The cooling substance reduces the temperature of the pipe junction and thereby freezes the contents of the pipe junction. Because different pipe junctions may have irregular shapes or varying dimensions, a flexible jacket material is preferable.

DETAILED DESCRIPTION

Figure 1:
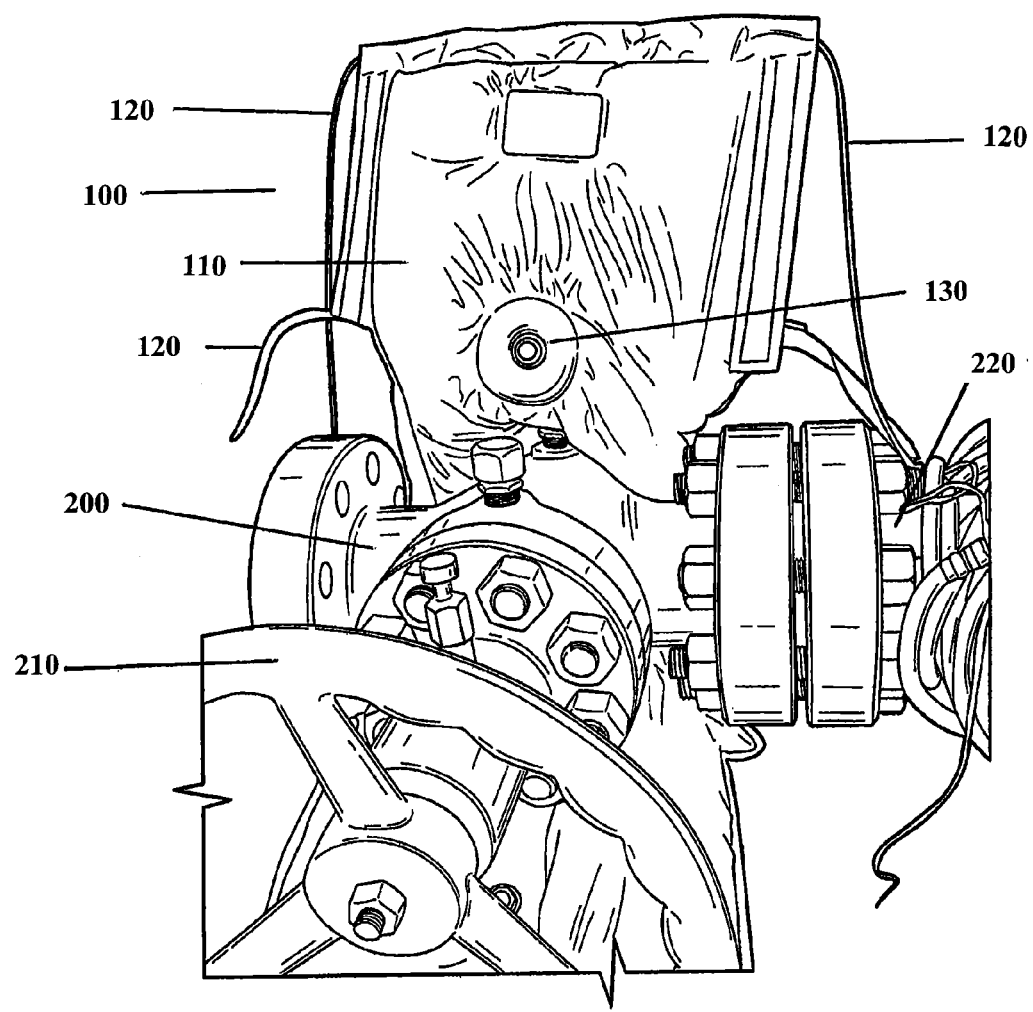
FIG. 1 is a perspective view of one embodiment of a jacket being applied to a valve.

As shown in the accompanying drawings, an embodiment of the invention is a insulated jacket 100. In FIG. 1, the insulated jacket 100 is shown in an open position about a pipe junction 200. A pipe junction 200 may be any fluid valve, connector, regulator, controller, or other device that permits or regulates fluid communication between two or more pipes. In some embodiments, the pipe junction may join pipes meeting at a non-linear angle. A pipe junction preferably comprises a housing that permits fluid communication from one pipe to another. For example, a pipe junction encompasses a three-way "tee" connection between three pipes or two pipes and a valve wheel (e.g., FIG. 1), a four-way "cross" connection between four pipes (e.g., see FIG. 6), or any other connection arrangement between two or more pipes. In FIG. 1, the chosen pipe junction 200 is a valve. A valve wheel 210 regulates the flow of fluid through the pipe junction 200. One pipe 220 is shown connected to the pipe junction 200 while the other pipe is not shown. As used herein, "pipe" means any conduit for conveying a fluid, regardless of material. In preferred embodiments, the method is applied to pipes made of metal or other conductive material.

The insulated jacket 100, when in the closed position (see, e.g., FIGS. 2 and 3), is shaped to at least substantially enclose the pipe junction 200. As a non-limiting example, a pipe junction is substantially enclosed when a jacket encloses the bulk of the mid-body area of a valve or cross component, namely, the portion of the junction between connection portals or flanges. In certain examples, substantially enclosing may mean covering a high percentage of the surface area of the junction, e.g., at least 60%, 70%, 80%, 90%, or 95% of the surface area. The insulated jacket may take different sizes and shapes depending on the pipe junction sought to be enclosed.

The insulated jacket 100 comprises an insulated jacket body 110. The jacket body 110 preferably comprises any waterproof synthetic cloth or fabric, e.g., Rayon, Nylon, Kevlar, or Mylar. A preferable insulation is at least ¾ inch closed cell foam. However, other insulating materials that achieve at least an R-value of 25 may be a suitable insulation substitute, however embodiments could employ an R-value of above 15, above 30, above 40, above 50, or higher. The insulated jacket 100 may be moved from an open position to a closed position by wrapping the jacket around the pipe junction 200 and engaging fasteners 120. Fasteners 120 may include one or more of two-piece metal snaps, opposing Velcro sections, button/button loop arrangements, and/or drawstring/sleeve arrangements. In FIG. 1 the chosen fasteners 120 are drawstring/sleeve arrangements and opposing Velcro sections. The insulated jacket 100 is preferably a wrap-around soft device.

Figure 2:
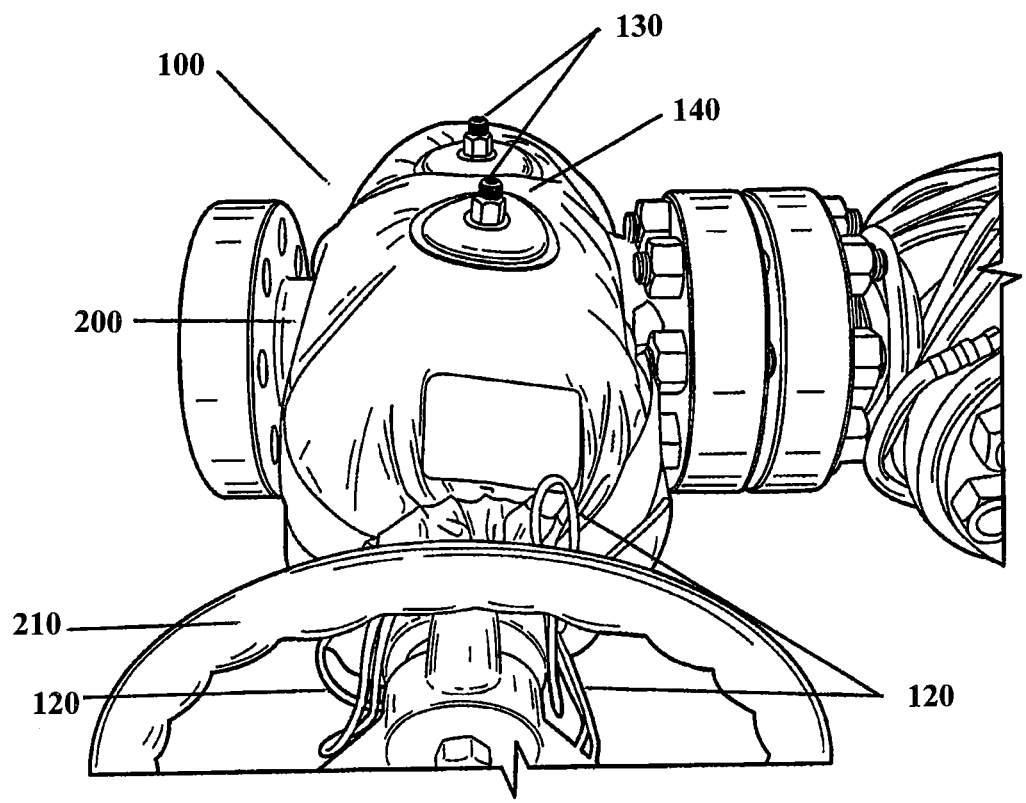
FIG. 2 is a perspective view of the jacket in FIG. 1 after being closed around the valve.

Turning to FIG. 2, the insulated jacket 100 is shown in a closed position and fasteners 120 are fully engaged. Two fluid injection valves 130 are positioned on the jacket top side 140 to permit the injection of a cooling substance into the freezing jacket 100. Fluid injection valves 130 are preferably orifice nozzles that spray a liquid cooling substance into the freezing jacket 100. The preferable cooling substance is liquid carbon dioxide, although other cooling substances such as liquefied air, liquid nitrogen, or other liquefied gas may be used. As a non-limiting example only, in order to freeze the contents of a pipe junction 200 containing a high pressure (3500 psi or higher) fluid, which may or may not comprise hydrocarbons, a preferable liquid carbon dioxide injection pressure is from about 1500 psi to about 2000 psi and more preferably about 1800 psi. Upon contact with the pipe junction, the carbon dioxide forms a dry ice solid. Fluids containing a substantial amount of liquid hydrocarbons, such as diesel, may be frozen in a pipe junction in this way. Preferably, the fluid to be frozen is in a static or low flow rate condition to the extent possible.

The number of fluid injections valves 130 may vary depending on the size of the pipe junction 200 to be frozen. Preferably, one injection valve 130 is used for every thirty-six square inches of jacket. However, more or less injection valves 130 may be used depending on the size and shape of the pipe junction 200 and the target temperature to be achieved. As a non-limiting example, a 2 and $\frac{1}{16}$ inch manual gate valve at 80 degrees Fahrenheit may be frozen in approximately 1 hour. Once frozen, the flow of the cooling substance may be reduced to maintain the frozen state of the fluid within the junction. There are several signs that may indicate whether the fluid within the junction is frozen, including: an ice ball forming inside the jacket and expanding in shape and firmness; information from one or more temperature sensors inside the jacket, on the junction itself, and/or on one or more bore connections; and information from a pressure gauge, if present. Another way to determine whether a given junction is frozen includes using negative/positive pressure tests against the junction.

Figure 3:
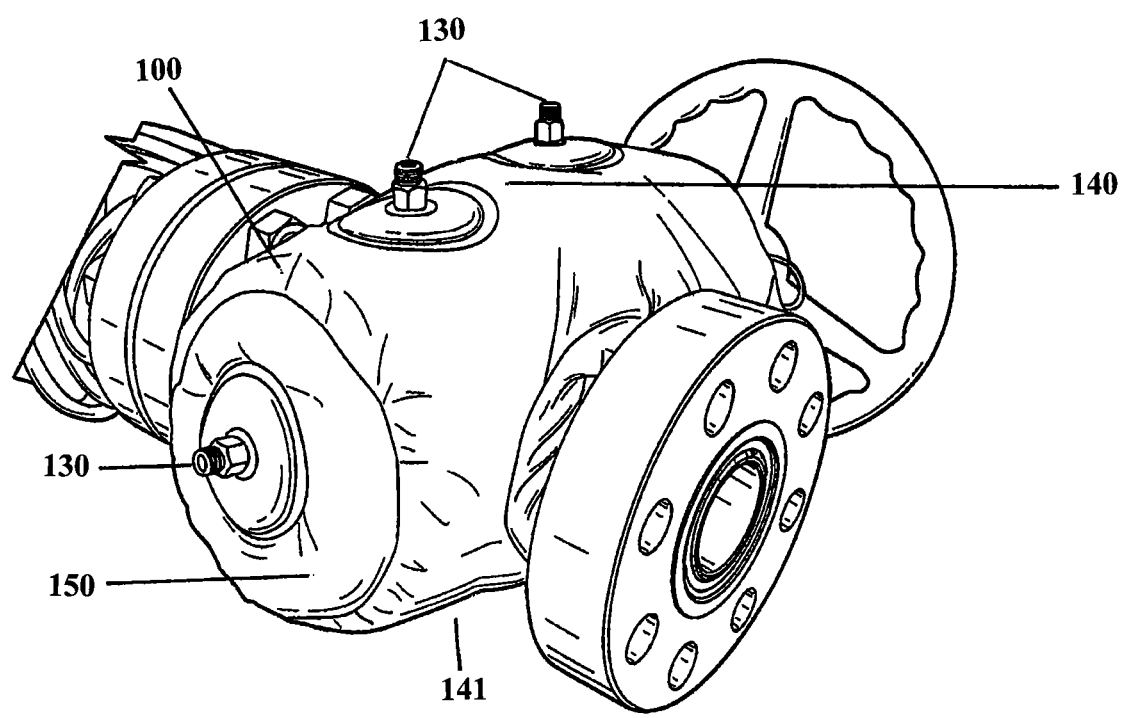
FIG. 3 is a perspective view of the jacket in FIG. 1 after being closed around the valve.
Figure 4:
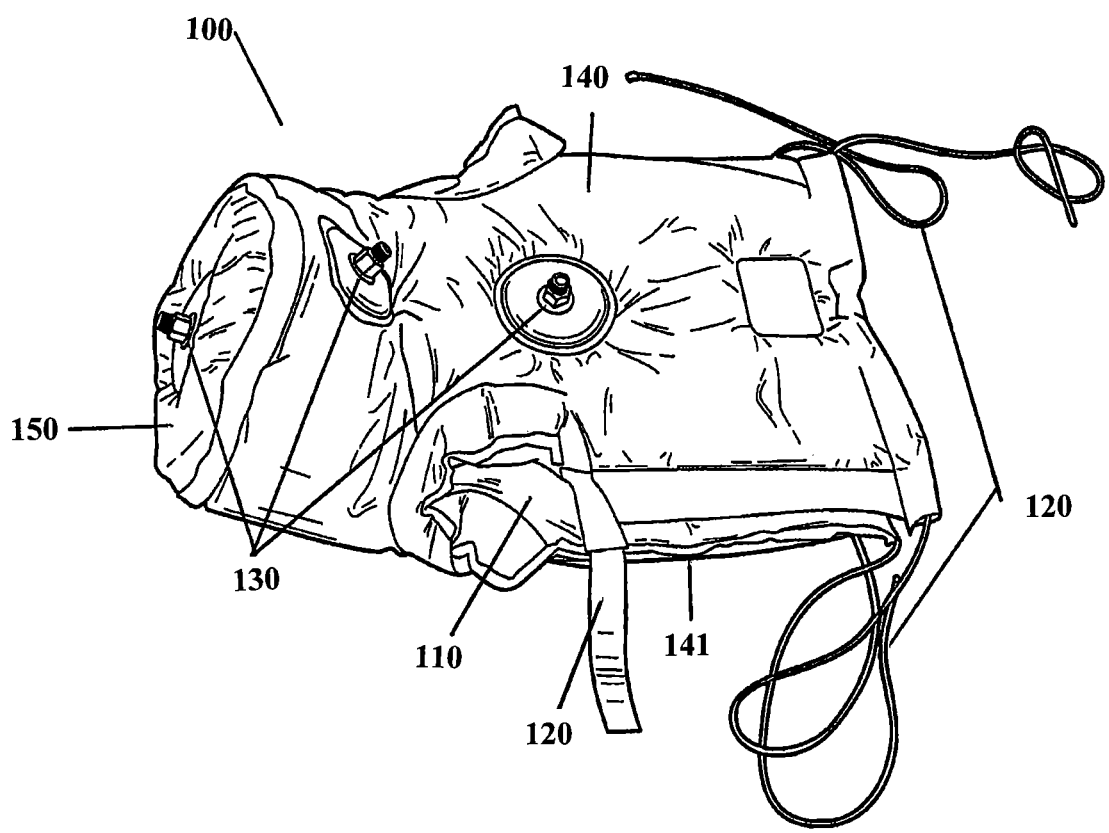
FIG. 4 is a perspective view of the jacket in FIG. 1 without a valve.
Figure 5:
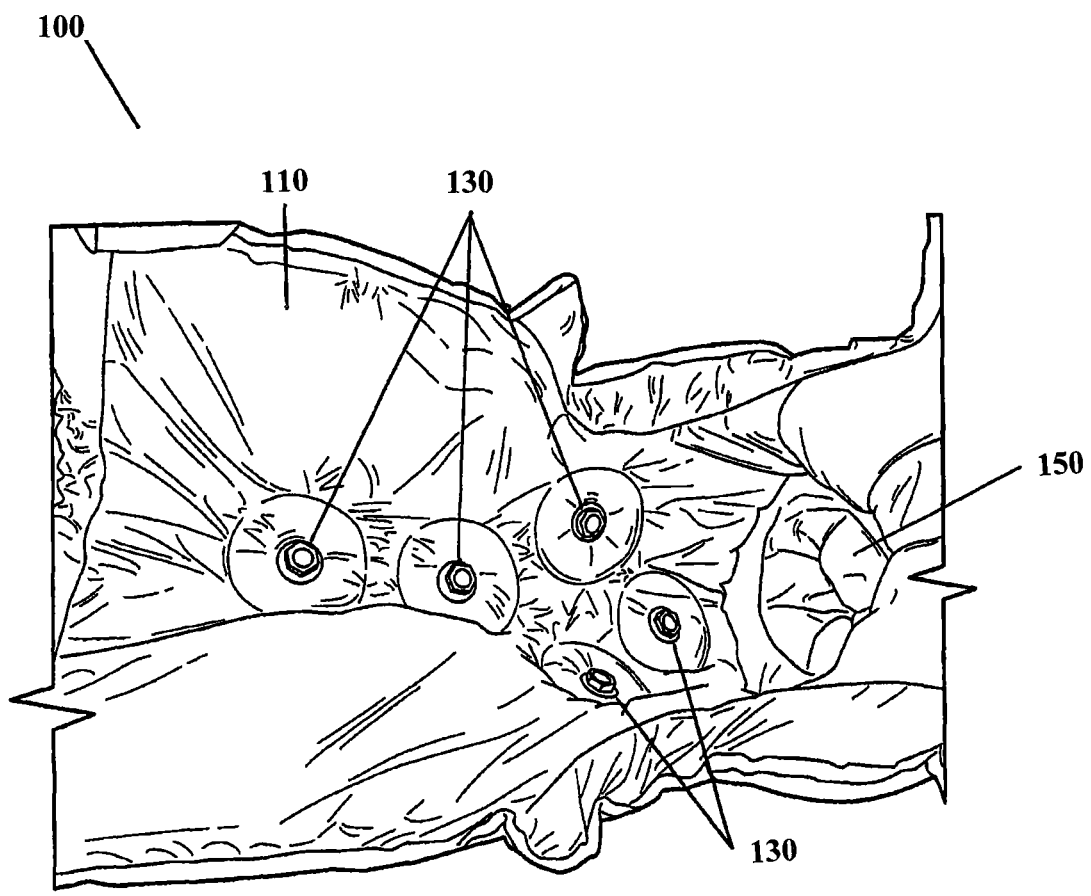
FIG. 5 is a perspective view of the inside of the jacket in FIG. 1.

Turning to FIG. 3, the insulated jacket 100 is shown in the closed position. Fluid injection valves 130 are located on the jacket top side 140, the jacket bottom side 141 (not shown), and the jacket closed end 150. FIG. 4 shows the insulated jacket 100 in an open position with the fasteners 120 not engaged. The jacket top side 140, jacket bottom side 141, and jacket closed end 150 are shown. FIG. 5 shows an inside view of the insulated jacket 100.

Figure 6:
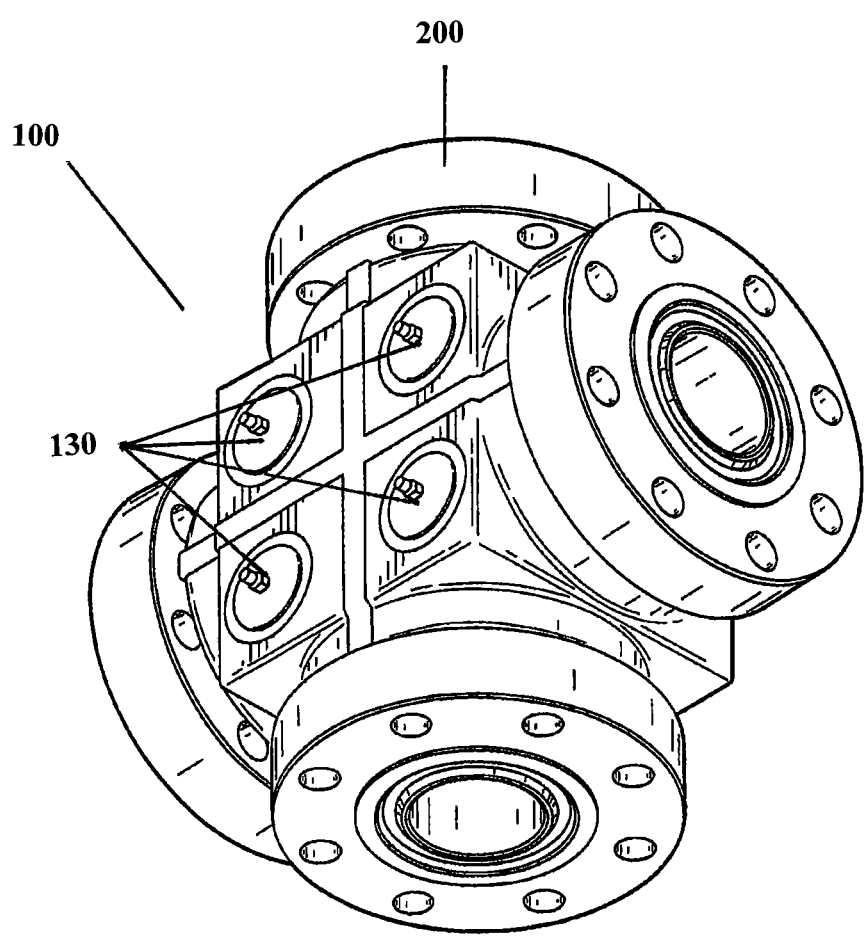
FIG. 6 is a perspective view of one embodiment of a jacket being applied to a four-way "cross" pipe component.

FIG. 6 shows a pipe junction 200, which is a four-way cross component. The freeze jacket 100 is shaped to substantially enclose the pipe junction 200 in its closed position. The freeze jacket 100 has fluid injection valves 130. Five-way cross components and valves are also known in the art. After the benefit of this disclosure, one of ordinary skill in the art would be able to design a flexible insulated jacket to substantially enclose such pipe junctions. The jacket or jacket body may be comprised of one or more sections, ends, or flaps of material that may or may not be detachable from one another when in an open or closed position.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

What is claimed is:

1. A method for freezing a liquid in a pipe junction connecting two or more pipes, said method comprising:
   a. providing a jacket comprising:
      i. a flexible insulated body shaped to have an open position and a closed position and the body having fasteners for retaining the body in the closed position;
      ii. at least two fluid injection valves communicating through the jacket body; and
      iii. wherein the body is shaped so that the body substantially encloses the pipe junction in the closed position;
   b. placing the jacket around the pipe junction; and
   c. injecting a pressurized cooling substance through the injection valves such that the cooling substance forms in a solid state over a majority of a surface area where the jacket body covers the pipe junction.

2. The method of claim 1, wherein the fasteners include one or more of: two-piece metal snaps, opposing hook and loop sections, button/button loop arrangements, drawstring/sleeve arrangements.

3. The method of claim 1, wherein the pipe junction contains a fluid comprising a hydrocarbon at a pressure of at least 3500 psi.

4. The method of claim 3, wherein the cooling substance is liquid carbon dioxide with an injection pressure from about 1500 psi to about 2000 psi.

5. The method of claim 1, wherein the fluid injection valves are one-way valves.

6. The method of claim 5, wherein the fluid injection valves are one-way check valves.

7. The method of claim 2, wherein the pipe junction connects three or four or five pipes and the jacket is shaped to substantially enclose the pipe junction.

8. The method of claim 2, the jacket further comprising at least two additional fluid injection valves and wherein the jacket has a top side and a bottom side and the at least two injection valves are positioned on the top side and the at least two additional fluid injection valves are positioned on the bottom side.

9. The method of claim 1, wherein the at least two fluid injection valves are integrated into the jacket body.

10. The method of claim 1, wherein the jacket has a closed end and at least two flaps extending from the closed end, wherein a fastener on at least one flap is used to bring at least two flaps together and substantially enclose a mid-body area of the pipe junction.

11. The method of claim 1, further providing a substantially enclosed volume around the pipe junction and an exterior volume and, during the injecting step, the at least two fluid injection valves communicating from the exterior volume to the substantially enclosed volume.

12. The method of claim 1, wherein the jacket comprises a waterproof cloth selected from the group consisting of Rayon, Nylon, Polyparaphenylene terephthalamide, and Polyethylene terephthalate.

13. The method of claim 12, wherein the jacket is a wrap-around soft device.

14. A jacket for freezing a pipe junction connecting two or more pipes comprising:
   a. a flexible insulated jacket body;
   b. the body shaped to have an open position and a closed position and the body having fasteners for retaining the body in the closed position;
   c. at least two fluid injection valves communicating through the body; and
   d. wherein the body is shaped so that the body substantially encloses the pipe junction in the closed position.

15. The jacket of claim 14, wherein the jacket has a closed end and at least two flaps extending from the closed end, and wherein fasteners on at least one flap are capable of retaining at least two flaps together to substantially enclose the pipe junction.

16. The jacket of claim 14, wherein the pipe junction that the jacket body is shaped to substantially enclose is connected to three or four or five pipes.

17. The method of claim 1, further comprising: tying at least two drawstrings together to secure the body in the closed position.

18. The method of claim 1, wherein the cooling substance communicates through the injection valves directly onto at least a portion of the surface area where the jacket body covers the pipe junction.

19. The method of claim 1, wherein the body has a first end, a second end, and a middle section between the first end and the second end, and wherein the at least two fluid injection valves are positioned on the middle section.

20. The method of claim 1, wherein a ratio is less than or equal to 1:36 between (i) a number of the at least two fluid injection valves and (ii) a total square inches of the surface area where the jacket body covers the pipe junction.

* * * * *